United States Patent
Bosshard et al.

(10) Patent No.: US 6,767,959 B2
(45) Date of Patent: Jul. 27, 2004

(54) ADHESIVES WITH GOOD MECHANICAL PROPERTIES, SUITABLE FOR USE WITH ANTENNAS

(75) Inventors: Bernhard Bosshard, Dietikon (CH); Michael Schlumpf, Stallikon (CH)

(73) Assignee: Sika AG, Vorm. Kaspar Winkler & Co., Zurich (CH)

( * ) Notice: Subject to any disclaimer, the term of this patent is extended or adjusted under 35 U.S.C. 154(b) by 0 days.

(21) Appl. No.: 10/032,447

(22) Filed: Jan. 2, 2002

(65) Prior Publication Data

US 2002/0132958 A1 Sep. 19, 2002

Related U.S. Application Data

(60) Provisional application No. 60/259,229, filed on Jan. 3, 2001.

(51) Int. Cl.$^7$ .................. C09J 175/04; C09J 175/08
(52) U.S. Cl. .................. 524/872; 524/280; 524/871; 524/875; 528/28; 528/29; 528/65; 528/67; 528/77; 528/85; 528/370; 252/511; 156/108; 156/331.4; 296/84.1
(58) Field of Search ................ 524/280, 871, 524/872, 875; 528/28, 29, 65, 67, 77, 85, 370; 252/511; 156/108, 331.4; 296/84.1

(56) References Cited

U.S. PATENT DOCUMENTS

| | | | |
|---|---|---|---|
| 4,107,386 A | * | 8/1978 | Gruber |
| 4,996,283 A | * | 2/1991 | Greco |
| 5,061,749 A | | 10/1991 | Ito et al. |
| 5,288,797 A | * | 2/1994 | Khalil |

FOREIGN PATENT DOCUMENTS

| | | | |
|---|---|---|---|
| EP | 210859 | | 2/1987 |
| EP | 533275 | | 3/1993 |
| JP | 02-003489 | * | 1/1990 |

OTHER PUBLICATIONS

Database WPI, Section Ch, Week 199346, Oct. 19, 1993.
Database WPI, Section Ch, Week 199011, Feb. 1, 1990.

* cited by examiner

Primary Examiner—David J. Buttner
(74) Attorney, Agent, or Firm—Burns, Doane, Swecker & Mathis, L.L.P.

(57) ABSTRACT

A filler containing adhesive is described that also in the presence of large amounts of conductive fillers such as low or non-oxidized carbon black shows good antenna impedance. Said adhesive is characterized by the presence of polycarbonate prepolymers, in particular prepolymers containing a group or formula I:

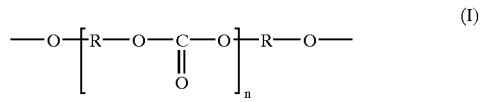

wherein R represents linear or branched, saturated or unsaturated aliphatic radical, a saturated or unsaturated cycloaliphatic radical, an aralphatic radical, or an aromatic radical with 3 to 10 carbon atoms, and n=1 to 8, preverably 2 to 5.

28 Claims, No Drawings

ADHESIVES WITH GOOD MECHANICAL PROPERTIES, SUITABLE FOR USE WITH ANTENNAS

This application claims priority under 35 U.S.C. § 119 to U.S. Provisional Application No. 60/259,229 entitled ADHESIVES WITH GOOD MECHANICAL PROPERTIES, SUITABLE FOR USE WITH ANTENNAS and filed on Jan. 3, 2001, the entire content of which is hereby incorporated by reference.

FIELD OF THE INVENTION

The present invention concerns novel polyurethane (PUR)-adhesives that, due to good antenna-values (antenna impedance) and insulation resistance in combination with good mechanical properties and reduced blister formation tendency, are especially well suited for the direct glazing of carpanes with integrated antennas.

BACKGROUND OF THE INVENTION

The requirements that adhesives for the direct glazing in vehicle manufacturing have to meet are steadily extended such that an adhesive has to fulfill several functions. One important additional property consists in that the adhesive for the assembly of vehicle panes with integrated antenna shall not affect the radio reception, and a further additional property consists in that contact corrosion shall be eliminated by the adhesive.

Today an adhesive that is suitable for the application in connection with antennas, i.e. an adhesive with good antenna impedance, and that has low conductivity can only be achieved by drastic reduction of the conductive fillers (e.g. carbon black). This, however, results in that the optimal adaptation of the rheological properties, in particular the non-sagging, as well as the achievement of good mechanical properties is limited, since the rheological as well as the mechanical properties depend from the kind and amount of the fillers.

The impedance problem on which the invention is based can be described as follows:

Panes carrying simultaneously antennas (antenna panes) comprise conductor structures that are in the panes or on the surface of the panes. Said antenna conductors are guided to the border of the panes, in order to be connected with the cables starting from said place. Said connections and bus bars at the borders of the panes can by chance or by intent come into contact with the adhesive used for the panes or said connections and bus bars can entirely be covered with said adhesive. By the adhesive, an additional impedance to the mass is formed, that is observed as blind component and active component. This results in a weaker received power. On the other hand, this also favours the oscillation transfer from the vehicle body to the antenna resulting in back ground noise.

Description of impedance:

Antenna Impedance: Equivalent-circuit diagram showing the influence of the adhesive

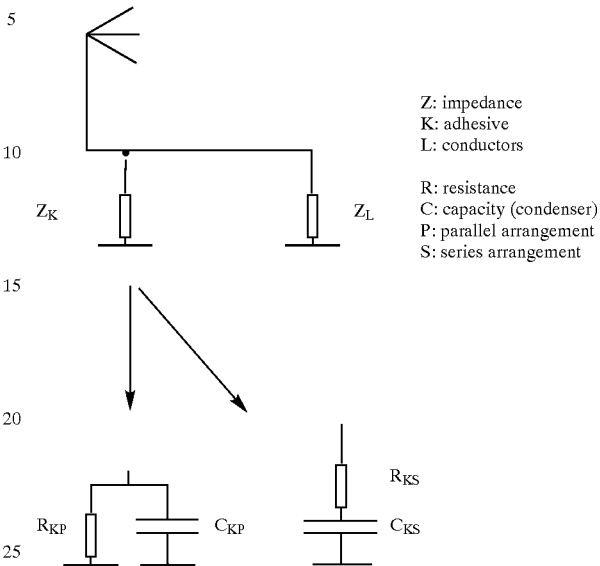

Z: impedance
K: adhesive
L: conductors

R: resistance
C: capacity (condenser)
P: parallel arrangement
S: series arrangement The above presented scheme describes the basic situation. ($R_{KS}$ represents: resistance (R) caused by the adhesive, in a series arrangement as model).

The antenna is loaded with the impedance $Z_K$ caused by the adhesive and the impedance of the system itself (conductors) $Z_L$. By the additional impedance $Z_K$ caused by the adhesive, the available signal voltage is reduced. This results in a worse received power.

For the impedance two equivalent-circuit diagrams are possible that both are applied. The parallel arrangement with the factors $R_{KP}$ and $C_{KP}$, or the series arrangement with the factors $R_{KS}$ and $C_{KS}$.

Said models can be converted into one another.

The impedance thus can be described by a resistance (R) and a capacity (C). Resistance and capacity are dependent on the frequency.

Between said factors the following relations exist:

$$R_{KS} = \frac{R_{KP}}{1+\omega^2 C_{KP}^2 R_{KP}^2} \text{ and } C_{KS} = \frac{1+\omega^2 C_{KP}^2 R_{KP}^2}{\omega^2 C_{KP} R_{KP}^2}$$

whereby $\omega$ represents the angular frequency ($=2\pi*$frequency).

The two factors ($R_{KP}$ and $C_{KP}$) or the factors deduced from said factors are now calculated in the automobile producing industry and are determined as standard values for adhesives to be used on panes, in particular wind screens (direct glazing adhesives).

The goal of the present invention thus was to provide adhesives that, without any reduction of the amount of conductive fillers, guarantee good antenna impedance and low conductivity in combination with high mechanical properties, and that are therefore very well suited for the joining of base metals and direct glazing.

BRIEF SUMMARY OF THE INVENTION

Hence, it is a general object of the invention to provide an adhesive that comprises at least one filler (filler comprising adhesive), said adhesive comprising a prepolymer consisting of a polycarbonate prepolymer with a polycarbonate polyol radical having an average equivalence weight (molecular weight per OH-group in the polyol) of about 100 to about 1000, in particular about 250 to about 750, more preferred about 250 to about 500, or from a prepolymer mixture containing a respective polycarbonate prepolymer.

Said compositions can be one-component (1C) compositions or two-component (2C) compositions, and said compositions are especially well suited for the application close to or on antennas.

DETAILED DESCRIPTION OF THE INVENTION

The at least one filler comprising adhesives of the present invention comprise a prepolymer consisting of a polycarbonate-prepolymer with a polycarbonate polyol radical having an average equivalence weight (molecular weight per OH-group in the polyol) of about 100 to about 1000, in particular about 250 to about 750, more preferred about 250 to about 500, or from a prepolymer mixture containing a respective polycarbonate prepolymer. Preferred polycarbonate prepolymers comprise a polycarbonate diol radical.

The inventive adhesives can be present as one-component or two-component compositions. They preferably contain in the prepolymer an amount of at least one polycarbonate diol radical of the following formula I:

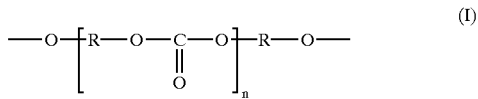

(I)

wherein R represents a linear or branched, saturated or unsaturated aliphatic radical, a saturated or unsaturated cycloaliphatic radical, an araliphatic radical or an aromatic radical, all radicals (as far as possible) with 3 to 10 carbon atoms, and n=1 to 8, preferably 2 to 5.

Preferred polycarbonate diols from which respective prepolymers result thus contain 1 to 8, preferably 2 to 5 polycarbonate groups and they had been obtained from linear or branched, saturated or unsaturated aliphatic, saturated or unsaturated cycloaliphatic, araliphatic aromatic diols with 3 to 10 carbon atoms, whereby saturated aliphatic diols are preferred.

Besides of the above mentioned diols also the use of small polyethers for the production of polycarbonate polyols is possible, however not preferred.

If polycarbonates resulting from short chain aliphatic diols are used, in particular diols with 3 to 6 carbon atoms, it is preferred that they are branched. Furthermore polycarbonate diols with average molecular weights of about 500 to about 1500, in particular about 500 to about 1000 are preferred, although longer chain polycarbonate diols lead to an improvement of the impedance, however to a minor extent.

For an improvement of the impedance it is furthermore essential that the prepolymers are incorporated into the network, and that they are not present in an inactive form, e.g. as precipitate. Particularly preferred prepolymers resulting from polycarbonates therefore are prepolymers with the above-mentioned characteristics.

The prepolymer in the one-component system is reactive with water (ambient humidity) and carries as end groups e.g. isocyanate groups, silane groups etc. Besides of the polycarbonate polyol radical that preferably comprises polycarbonate diol radicals, said prepolymer can contain further polyol radicals. Said polyol radicals preferably, in particular for one-component systems, stem from polyether polyols, in general polyether polyols with a functionality between 1.5 and 3 and a molecular weight between 400 and 20,000. Such further polyols are in general present in amounts of from 5 to 85% by weight, preferably 10 to 75% by weight, referred to the total weight of the adhesive.

It is particularly preferred that the polycarbonate diol radicals and the other polyol radicals in the prepolymer are present in separate molecules, that is not as mixed molecules that contain, in the same molecule, polycarbonate chains as well as e.g. polyether chains.

The amount of polycarbonate polyol radicals (referred to polycarbonate polyol) is from 0.1 to 45% by weight, preferably 1 to 30% by weight, particularly preferred 2 to 25% by weight, referred to the whole amount of adhesive. The polycarbonate polyol used for the production of the prepolymer can be present in liquid or in solid form and it is preferably produced by transesterification of a low molecular, carbonate group containing compound such as e.g. diethyl carbonate, propylene carbonate etc., with a short chain diol such as e.g. 1,4-butanediol, 1,6-hexanediol etc.

The production of isocyanate groups containing PUR-prepolymers is known. It is usually performed at temperatures between 25° C. and 100° C. and possibly in the presence of a catalyst, e.g. dibutyl tin dilaurate. In most cases, said production is performed in about stoichiometric ratio, i.e. with preferably 1.5 to 2.1 isocyanate groups per H-active group in form of two or more isocyanate groups containing monomers.

The production of prepolymers terminated by silane groups can be made in an analogous way or by subsequent reaction of an isocyanate groups containing prepolymer with an aminosilane or a mercaptosilane.

The fillers contained in the adhesive system are preferably structure forming fillers, in particular conducting structure forming fillers. The fillers are usually present in total amounts of about 10% to about 80% by weight, preferably in total amounts of about 20% to about 50% by weight, and much preferably in total amounts of about 30% to about 40% by weight, whereby usually at least 3% by weight, preferably at least 10% by weight of the fillers are conductive fillers, in particular carbon black (all percentages are referred to the total weight of the adhesive). It is of course also possible that all fillers are conductive fillers, preferably carbon black, present in the amounts mentioned above for the total filler content.

Examples for fillers are chalks, kaolins, silicates, and in particular carbon black. Thixotropic fillers are aerosil, and soccal-chalks.

Carbon black is a preferred filler since it is cheap and has very good structure giving properties. Furthermore carbon black of which only a minor part is oxidized is characterized by a high adsorption capacity for $CO_2$ which is in particular essential for a blister-free curing of isocyanate-terminated prepolymers with water or ambient humidity, respectively. It is therefore a great advantage of the inventive adhesives that they can comprise large amounts of conductive carbon black.

The adhesives of the present invention that are based on polycarbonate prepolymers can also be present as two-component (2C) systems, in particular with diamine, diol and/or water in the curing component.

In particular for the curing with water, the $CO_2$-adsorption in carbon black containing 2C-systems is a very important advantageous additional effect.

A 2C-adhesive with a resin component containing polycarbonate diol and polyisocyanate as curing component, in particular diisocyanate, is also possible and leads to good results as long as the polycarbonate diol is the only present diol. In the present of further diols in the resin component, however, undesired chain extension reactions with e.g. polyetherpolyols may occur that lead to a product with less good impedance.

The adhesive systems of the present invention can consist of the prepolymer of the present invention and a filler, in particular a structure giving filler, or they can optionally contain a further prepolymer or usual additive and auxiliaries, for example plastizisers, catalysts, latent curing agents, adhesion promotors, dyes, pigments, UV-absorbing agents, stabilizers, antioxidants, surface active additives, flame retarders, fungistatically active substances etc. The kind and amount of such additives is dependent from the use of the inventive compositions. During the production of the inventive compositions, it has to be assured that as few as possible humidity is introduced. All used components should be as free of water as possible.

Besides of good antenna impedance and high insulation resistance, the adhesive of the present invention also effects higher mechanical property values, in particular of the modules, as well as reduced blister formation tendency. A reasonable explanation seems to be that the polycarbonate polyole radical forms hydrogen bonds and therewith enhances the mechanical properties.

The compositions of the present invention, dependent on the requirements, can be used for joining, sealing or coating, and they are in particular applied in the vehicle manufacturing during the final assembly, in particular for the direct glazing of panes with integrated antenna. Since the adhesives of the present invention also effect high stiffening, they are also essential parts for the light-weight construction method in the vehicle construction.

Below, some examples shall be shown that further describe the invention. Said examples, however, shall not reduce the scope of the invention in any way.

EXAMPLES

| Raw materials used in the Examples: | obtained from: |
| --- | --- |
| MDI-prepolymer based on polypropylene triol, (m.w. ≈ ca. 4500 g/mol, NCO-content ≈ 2.3%) | Sika, CH |
| Plastiziser (diisodecylphthalate) | BASF Schweiz AG, CH |
| Carbon black | Degussa, DE |
| Kaolin | Cell Chemie AG |
| Thixotropic agent (organic) | Sika, CH |
| Sn-catalyst (dibutyltindilaurate) | MG Chemag AG |
| Hydrophobic silic acid | Degussa, DE |

MDI = Methylenediphenyldiisocyanate
The fillers were dried at 130° C., for 48 hours.
DE = Germany
CH = Switzerland Production of a prepolymer on NCO-Basis A reaction vessel was provided with polyol and plastiziser, and the mixture was heated to 80° C. Isocyanate (NCO/OH-ratio=2) was added and the composition was mixed under nitrogen until the NCO-content changed for less than 0.05% within half an hour. For the determination of the NCO-content, dibutylamine solution was added to the sample, and a back-titration was formed with hydrochloric acid.

Production of the Adhesives

Compositions and features of adhesives (formulated with the specific prepolymer according to the invention=PC-prep.) are shown in Table 1 in comparison with a reference composition. The production took place in such a way that all components were compounded to a lump-free adhesive paste in a vacuum mixer. The adhesive was then filled into cartridges in the usual way.

TABLE 1

| | Information in percents by weight | | | |
| --- | --- | --- | --- | --- |
| Formulation | Reference | 1 | 2 | 3 |
| DIPD | 11 | 11 | 11 | 11 |
| MDI-prep. | 40 | 38 | 35 | 30 |
| Carbon black | 15 | 15 | 15 | 15 |
| Kaolin | 20 | 20 | 20 | 20 |
| Silicic acid | 2 | 2 | 2 | 2 |
| Thixotropic agent | 10 | 10 | 10 | 10 |
| PC-prep. | 0 | 2 | 5 | 10 |
| Catalyst | 2 | 2 | 2 | 2 |

DIDP = plastiziser
Thixo = thixotropic agent
PC-prep. = polycarbonate prepolymer with the following specification: polycarbonatediol: 500 g/mole, based on dimethylcarbonate and 1,6-hexanediol, (about 50% by weight of the PC-Prep.)
MDI: 250 g/mole (about 50% by weight of PC-prep.)

Results

| Adhesive | Insulation Resistance [Ω · cm] | ∈r' | | | | ∈r" | | | |
|---|---|---|---|---|---|---|---|---|---|
| | | 1 MHz | 6 MHz | 100 MHz | 500 MHz | 1 MHz | 6 MHz | 100 MHz | 500 MHZ |
| Reference | 3 · 10$^7$ | 46.9 | 28.1 | 14.8 | 11.8 | 40.6 | 15.4 | 5.1 | 3.0 |
| 1 | 3 · 10$^8$ | 17.8 | 14.6 | 10.6 | 9.4 | 3.9 | 2.6 | 1.8 | 1.2 |
| 2 | 1 · 10$^9$ | 14.7 | 12.9 | 10.0 | 9.1 | 1.7 | 1.56 | 1.38 | 0.94 |
| 3 | 3 · 10$^9$ | 15.8 | 13.7 | 10.5 | 9.6 | 2.26 | 1.83 | 1.48 | 1.02 | whereby the dielectricity constant is ∈r = ∈r' − j · ∈r"

| Adhesive | Tensile Elongation [%] | Strengt [MPa] | E-Modules [MPa] | | | |
|---|---|---|---|---|---|---|
| | | | 0.5–5% | 0.5–25% | 25–50% | 75–100% |
| Reference | 453 | 7.8 | 5.1 | 4.0 | 3.0 | 2.5 |
| 1 | 505 | 9.6 | 7.4 | 5.1 | 3.6 | 2.7 |
| 2 | 454 | 8.9 | 11.4 | 7.1 | 4.4 | 2.9 |
| 3 | 447 | 10.2 | 23.4 | 10.9 | 5.2 | 2.7 |

While there are shown and described presently preferred embodiments of the invention, it is to be distinctly understood that the invention is not limited thereto but may be otherwise variously embodied and practised within the scope of the following claims.

What is claimed is:

1. An adhesive comprising at least one filler and a prepolymer mixture comprising (1) at least one polycarbonate prepolymer comprising a polycarbonate polyol radical with a mean equivalence weight of 100 to 1000, and (2) a prepolymer based on a non-polycarbonate polyol, wherein the polycarbonate prepolymer has end groups selected from the group consisting of isocyanate groups, silane groups and mixtures thereof, and at least 3% by weight of the filler comprises at least one conductive filler.

2. The adhesive of claim 1, which is a one-component adhesive.

3. The adhesive of claim 1, which is a two-component adhesive.

4. The adhesive of claim 1, wherein the polycarbonate polyol radical is a polycarbonate diol radical.

5. The adhesive of claim 4 wherein the polycarbonate diol radical has the following formula I:

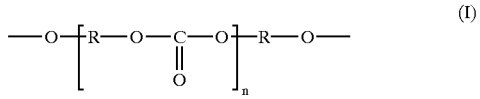

(I)

wherein R represents a linear or branched, saturated or unsaturated aliphatic radical, a saturated or unsaturated cycloaliphatic radical, an araliphatic radical, or an aromatic radical with 3 to 10 carbon atoms, and n=1 to 8.

6. The adhesive of claim 5, wherein the polycarbonate diol radical has a mean molecular weight of 500 to 1500.

7. The adhesive according to claim 1, wherein the polycarbonate prepolymer is present in an amount of from 0.1 to 75% by weight, and the filler is present in an amount of from 10 to 80% weight, each referred to the whole weight of the adhesive.

8. The adhesive of claim 1, wherein the at least one conductive filler is present in amounts of from 3 to 80% by weight, referred to the total weight of the adhesive.

9. The adhesive of claim 1, wherein the non-polycarbonate polyol has a functionality between 1.5 and 3 and an average molecular weight between 400 and 20,000.

10. The adhesive of claim 9, wherein the non-polycarbonate polyol is present in amounts of from 5 to 85% by weight referred to the weight of the adhesive.

11. Method for the production of an adhesive according to claim 7, wherein said prepolymer mixture containing a polycarbonate prepolymer is mixed with at least one filler under water-free conditions.

12. Method according to claim 11, wherein said prepolymer mixture contains prepolymers with poly-etherpolyol radicals.

13. Method for direct glazing of antenna-containing panes wherein an adhesive according to claim 8, is applied in close proximity or on parts of the antenna.

14. Method for the production of an adhesive according to claim 1, wherein said prepolymer mixture containing a polycarbonate prepolymer is mixed with at least one filler under water-free conditions.

15. Method for direct glazing of antenna-containing panes wherein an adhesive according to claim 1, is applied in close proximity or on parts of the antenna.

16. The adhesive of claim 1, wherein said polycarbonate radical has a mean equivalence weight of 250 to 750.

17. The adhesive of claim 1, wherein said polycarbonate radical has a mean equivalence weight of 250 to 500.

18. The adhesive of claim 1, wherein the non-polycarbonate polyol is a polyetherpolyol.

19. The adhesive of claim 18, wherein the polyetherpolyol comprises a reaction product with a polyisocyanate.

20. The adhesive of claim 5, wherein n=2 to 5.

21. The adhesive of claim 6, wherein the polycarbonate has a mean molecular weight of 500 to 1000.

22. The adhesive of claim 7 wherein the polycarbonate prepolymer is present in an amount of 1 to 25% by weight and the filler is present in an amount of 20 to 50% by weight.

23. The adhesive of claim 1, wherein the conductive filler comprises carbon black.

24. The adhesive of claim 8, wherein the conductive filler is present in an amount of 10 to 50% by weight.

25. The adhesive of claim 8, wherein the conductive filler is present in an amount of 20 to 40% by weight.

26. The adhesive of claim 10, wherein the non-polycarbonate polyol is present in an amount of 10 to 75% by weight.

27. A glazing adhesive for antenna-containing windscreens comprising (a) a conductive filler present in an amount of 10–50 wt %; (b) about 1 to 25 wt. % of a polycarbonate prepolymer comprising a polycarbonate diol radical having a mean equivalence weight of 100 to 1000, a mean molecular weight of 500 to 1500, and the following formula:

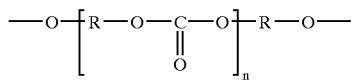

wherein R represents a linear or branched, saturated or unsaturated aliphatic radical, a saturated or unsaturated cycloaliphatic radical, an araliphatic radical, or an aromatic radical with 3 to 10 carbon atoms, and n=1 to 8; and (c) about 10 to 75 wt. % of a non-polycarbonate prepolymer prepared by reacting a polyisocyanate and a polyetherpolyol, wherein said polyetherpolyol has a functionality between 1.5 and 3 and an average molecular weight of 400 to 20,000.

28. An automobile windscreen having an antenna and prepared by the method claim 15.

* * * * *